United States Patent Office 2,830,974
Patented Apr. 15, 1958

2,830,974

RECOVERY OF UNREACTED VINYLPYRIDINE MONOMER FROM POLYMERIZATION SYSTEMS

Willie W. Crouch, Bartlesville, Okla., assignor to Phillips Petroleum Company, a corporation of Delaware No Drawing. Application September 12, 1955
Serial No. 533,912

11 Claims. (Cl. 260—82.1)

This invention relates to a process for the recovery of unpolymerized vinylpyridine monomers from systems in which the vinylpyridine has been copolymerized with a conjugated diene.

Copolymers of vinylpyridine and a conjugated diene are conventionally made by emulsion polymerization. The reaction is usually terminated prior to completion by introduction of a shortstop to the reactant mixture. The unreacted conjugated diene (usually 1,3-butadiene) is readily removable by distillation in conventional manner but removal of the pyridine monomer from the latex is more difficult because of foaming and polymer coagulation in the column. Because of the difficulty of removal of the pyridine monomer by distillation, it has been customary to extend the polymerization to 80–90 percent conversion. This has the disadvantage of requiring longer reaction times or the use of a booster charge of initiator. Even then the stripping of the high boiling monomer from the latex is troublesome. By the process of this invention, the recovery of the vinylpyridine monomer after coagulation of the polymer simplifies the recovery and permits polymerization to any conversion, although it is preferred to obtain conversions of at least 50 percent.

The principal object of the invention is to provide a process for the recovery of vinylpyridine monomers from latex systems in which a vinylpyridine is copolymerized with a conjugated diene. Another object of the invention is to provide a process for the recovery of vinylpyridine monomers from latex systems containing the same which is simple, operates at atmospheric pressure, entails recovery from a serum substantially free of solid polymer and avoids stripping of vinylpyridine monomers from a polymer latex. Other objects of the invention will become apparent from a consideration of the accompanying disclosure.

The copolymers with which this invention is concerned are produced by emulsion polymerization at temperatures generally in the range of 0 to 140° F. Any catalyst or initiator system can be used. Examples of some such systems are the iron pyrophosphate-hydroperoxide, either sugar-free or containing sugar, the sulfoxylate and the persulfate recipes. Any suitable emulsifier such as fatty or rosin acid soaps or the like can be used. These recipes usually contain 1–9 parts of emulsifier per 100 parts of monomers. The vinylpyridine component employed has the structural formula

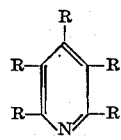

where R is hydrogen, or the alkyl, vinyl and alpha-methylvinyl (isopropenyl) groups, with at least one and not more than two of the groups being vinyl or alpha-methylvinyl groups, and the total number of carbon atoms in the alkyl groups being not greater than 12. The preferred alkyl groups are the methyl and ethyl. Some examples of these compounds are: 2-vinylpyridine, 2,5-divinylpyridine, 2-methyl-5-vinylpyridine, 2,3,4-trimethyl-5-vinylpyridine, 3-ethyl-5-vinylpyridine and the like. The conjugated dienes employed are usually those containing 4 to 6 carbon atoms per molecule such as 1,3-butadiene, isoprene, piperylene, methylpentadiene, 2,3-dimethyl-1,3-butadiene, chloroprene, and others. Conjugated dienes of more than 6 carbon atoms can be used, as well as the various alkoxy, such as methoxy and ethoxy, and cyano derivatives. In the preparation of the copolymers, the amount of the conjugated diene used is generally in the range of 50–98 parts by weight per 100 parts of monomers with the vinylpyridine component in the range 50–2 parts.

When the polymerization is to be terminated, a shortstop and an antioxidant are added and the more volatile component, such as the 1,3-butadiene, is recovered by an appropriate flashing method. The latex is then, preferably, diluted with water and creamed with a saturated brine solution. This keeps the crumb fine and facilitates recovery of the vinylpyridines. The method of this invention is, however, not limited to creaming since the invention can be practiced without creaming. The polymer is then coagulated with an acidic material, such as sulfuric acid, hydrochloric acid, acetic acid, or the like. A highly ionizing acid is preferred. One means of effecting cogulation is to pass separate streams of the latex and coagulant to a coagulating vessel. Another means is to blend separate streams of the latex and coagulant just prior to the entrance of the combined streams into the coagulating vessel. The materials are agitated during coagulation and the pH of the serum is preferably maintained below a pH of about 4.

After coagulation the serum and crumb are separated by a suitable means such as decantation, filtration, and the like. The crumb is then washed with water or aqueous caustic and the washings are added to the serum previously separated for further treatment. If the wash solution is kept warm, about 180° F., the solubility of the pyridine salt is more favorable, resulting in a higher recovery. The combined serum and crumb wash solutions are made alkaline with sodium hydroxide or other suitable base and the vinylpyridines are then readily recovered by decantation of the insoluble phase, by extraction, or by distillation.

It will be seen that the invention provides for coagulation of the polymer with an acidic material which is capable of giving the vinylpyridine salt prior to separation of the vinylpyridine monomer. Subsequent to separation of the serum and crumb the vinylpyridine is recovered from the aqueous phase by treatment with an inorganic base followed by extraction, decantation, or distillation. Pentane, benzene, and other hydrocarbons of these types are suitable solvents for vinylpyridines for extraction purposes.

If large amounts of water have been used it might, of course, become necessary to recover the vinylpyridine from the water phase by a suitable process such as "salting out" with an inorganic salt such as sodium chloride. The water and vinylpyridine phases can be recycled to the process. A build up of non-polymerizable material in the system would require occasional separation of such components from the reactor feed stream. The process may be operated either batch wise or continuously.

The value of the vinylpyridine component is such that its recovery, even in systems where the polymerization conversion is 80 percent or higher, is a definite asset. Some advantages of the present invention include the use of atmospheric pressure, the substantial avoidance of column fouling, and operation with alkaline serum and wash streams which favor pyridine separation.

The polymer compositions of this invention can be employed in the manufacture of various types of molding compositons, specialty rubbers, oil resistant rubbers, and the like.

The following example illustrates one embodiment of the invention but is not to be interpreted as unnecessarily limiting the same.

*Example*

A butadiene/2-methyl-5-vinylpyridine copolymer was prepared by emulsion polymerization at 122° F. with the following recipe.

|  | Parts by weight |
|---|---|
| Butadiene | 70 |
| 2-methyl-5-vinylpyridine [1] | 30 |
| Water | 180 |
| Potassium fatty acid soap | 5 |
| $K_2S_2O_8$ | 0.9 |
| Mixed tertiary mercaptans | 0.3 |

[1] Contained some methyl-ethylpyridine R. I. charge 1.5390 at 25° C.

The polymerization was carried to 66 percent conversion in 8 hours. The reaction was shortstopped with 0.1 part tertiary-butylhydroquinone, based on 100 parts of the latex, and 2 parts, based on 100 parts of rubber, of phenyl-beta-naphthylamine was added as the antioxidant. After venting the latex, 300 grams of water was added to 200 grams of latex. The latex was then creamed with saturated brine.

The polymer was then coagulated with dilute sulfuric acid until the serum pH was about 3. The serum was separated by filtration and the crumb was washed twice with warm water. The combined serum and wash solution was made alkaline with sodium hydroxide and distilled. About 200 cc. of distillate was collected and the 2-methyl-5-vinylpyridine was salted out with sodium chloride. In this manner 6.6 grams of the pyridine, which had a refractive index of 1.5178 at 25° C. after drying, was recovered. The refractive index was lower than the charge material because the methylethylpyridine is now a large proportion of the mixture. The refractive index of methylethylpyridine is 1.4940 at 25° C. Based on the assumption that the polymer is 73/27 butadiene/2-methyl-5-vinylpyridine and that the charge is pure vinylpyridine, the recovery of the unreacted monomer was about 73 percent of theoretical.

Certain modifications of the invention will become apparent to those skilled in the art and the illustrative details disclosed are not to be construed as imposing unnecessary limitations on the invention.

I claim:

1. A process for recovering vinylpyridine from a latex comprising a copolymer of a vinylpyridine and a conjugated diene, comprising adding an acid coagulant to said latex so as to coagulate said copolymer; separating coagulated copolymer from the resulting serum; rendering said serum alkaline; and recovering vinylpyridine from the resulting alkaline serum.

2. The process of claim 1 wherein the pH of the latex in the coagulation step is reduced to less than about 4.

3. The process of claim 1 wherein the vinylpyridine is recovered by distillation of the alkaline serum.

4. The process of claim 1 wherein the vinylpyridine is recovered by extraction with a water-insoluble hydrocarbon solvent for vinylpyridine.

5. The process of claim 1 wherein the vinylpyridine is recovered by decantation.

6. The process of claim 1 wherein the acid coagulant comprises sulfuric acid.

7. The process of claim 1 wherein the serum is rendered alkaline by the addition of sodium hydroxide.

8. The process of claim 1 wherein the acid coagulant is dilute sulfuric acid and the alkalizing agent is sodium hydroxide.

9. The process of claim 1 wherein the vinylpyridine comprises 2-methyl-5-vinylpyridine and the diene comprises 1,3-butadiene.

10. The process of claim 9 wherein the acid coagulant is dilute sulfuric acid and the alkalizing agent is sodium hydroxide.

11. A process for recovering vinylpyridine from a latex comprising a copolymer of a vinylpyridine and a conjugated diene, comprising adding an acid coagulant to said latex so as to coagulate said copolymer; separating coagulated copolymer from resulting serum; washing said coagulated copolymer with water, combining the effluent wash water with said serum; rendering the resulting aqueous serum alkaline; and recovering vinylpyridine from the alkaline aqueous serum.

References Cited in the file of this patent

UNITED STATES PATENTS 2,495,147    Street    Jan. 17, 1950

FOREIGN PATENTS 609,059    Great Britain    Sept. 24, 1948